May 22, 1951   J. D. BROSICK   2,553,891
AUTOMOBILE WHEEL
Filed Sept. 29, 1948   2 Sheets-Sheet 1
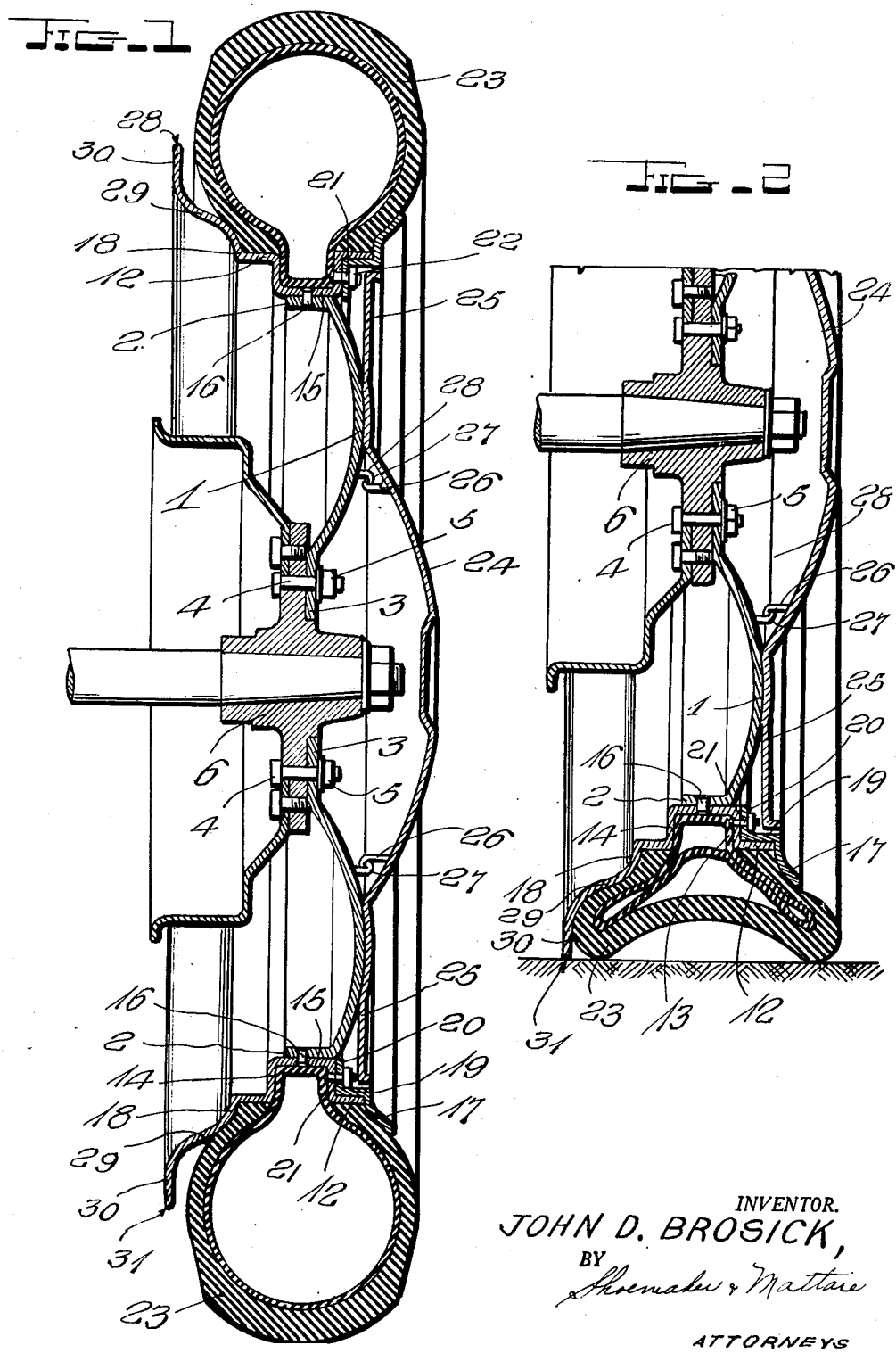
INVENTOR.
JOHN D. BROSICK,
BY
Shoemaker & Mattare
ATTORNEYS May 22, 1951          J. D. BROSICK          2,553,891
AUTOMOBILE WHEEL
Filed Sept. 29, 1948          2 Sheets-Sheet 2
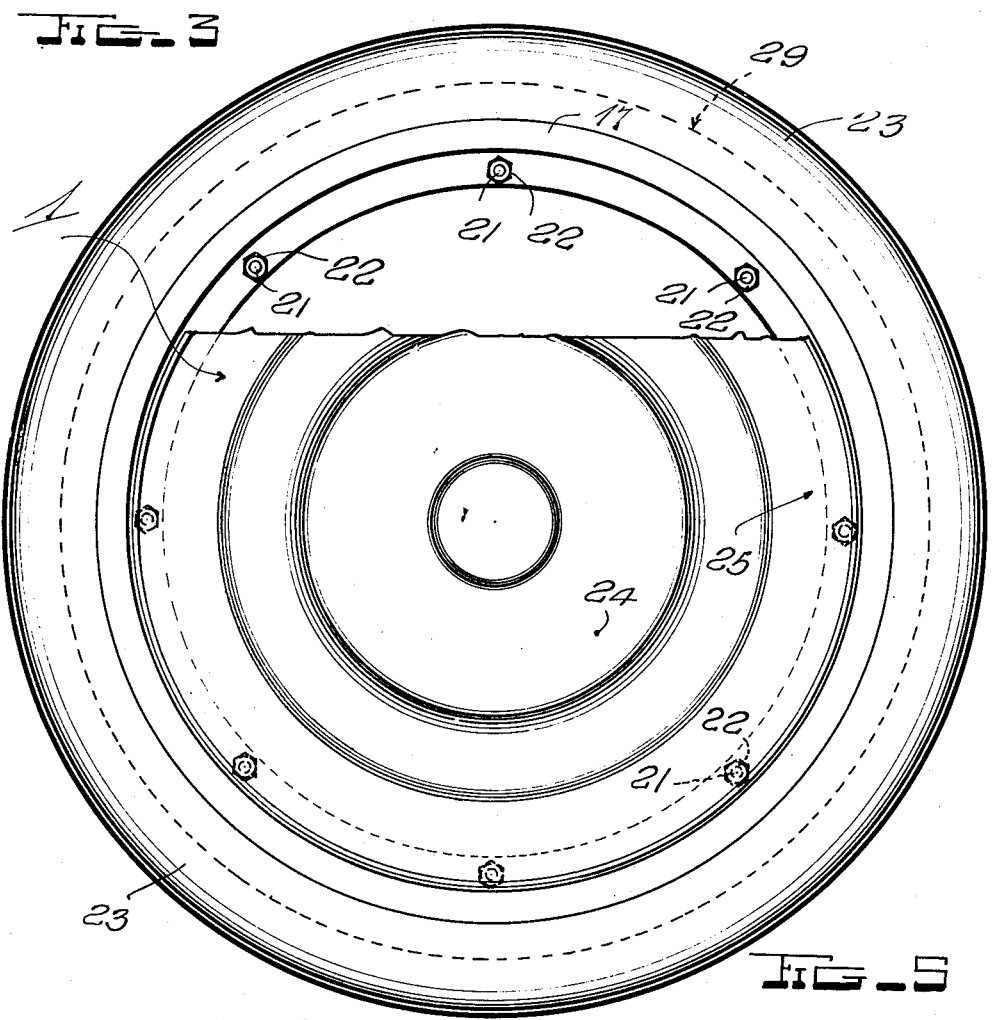
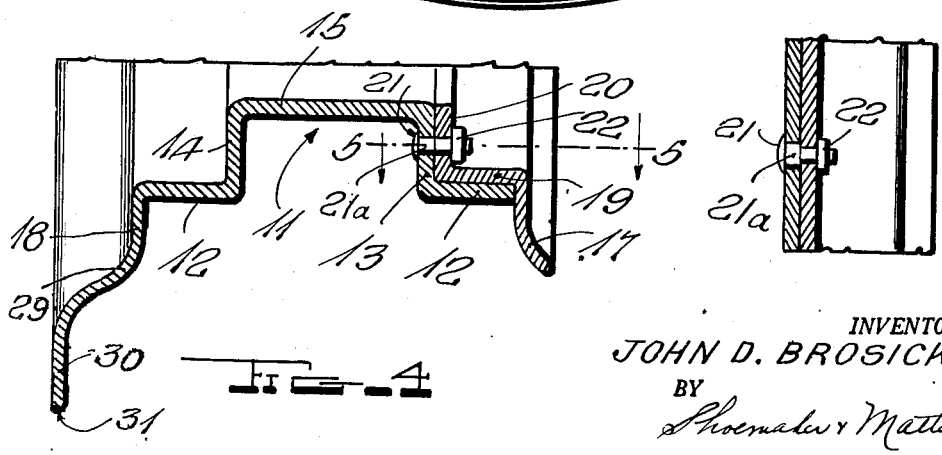
INVENTOR.
JOHN D. BROSICK,
BY
Shoemaker & Mattare
ATTORNEYS Patented May 22, 1951

2,553,891

UNITED STATES PATENT OFFICE 2,553,891

AUTOMOBILE WHEEL

John D. Brosick, Fayette City, Pa.

Application September 29, 1948, Serial No. 51,679

1 Claim. (Cl. 301—39)

This invention relates to improvements in automobile wheels.

An important object of the invention is to provide an improved wheel rim of the centrally channelled or drop-center type so formed and equipped with tire-retaining flange attaching means as to materially increase the strength of this type of rim, to provide a relatively light, yet sturdy, rim structure and which will permit the ready mounting of a tire thereon and removal of the same therefrom.

A particularly important novel characteristic of the invention resides in the provision of a drop center type rim, the central channeled part of which has both of its side walls integrally formed with the intermediate wall thereof and extending parallel with the plane of the wheel, and the annular side portions of the rim being continuous with said side walls, in conjunction with a removable tire-retaining flange at one side of the rim provided with an attaching part of ring formation having a portion extending laterally inwardly from the inner marginal portion of the tire-retaining flange to fit within an annular side portion of the rim, and said attaching part having a radially extending portion extending inwardly from the inner marginal part of said laterally extending portion to fit against the adjoining side wall of the rim.

A further object of the invention is to provide a rim having thereon an improved form of safety rim part of strong, satisfactory construction adapted to engage the ground and reduce the drop upon the deflation of a tire on the rim.

The invention, with other objects and advantages thereof, and the particular construction, combination and arrangement of parts comprising the same, will be understood from the following detailed description when considered in connection with the accompanying drawings forming part hereof and illustrating one embodiment of the invention.

In the drawings;

Fig. 1 is a vertical transverse section of a wheel construction in accordance with the present invention;

Fig. 2 is a fragmentary vertical section of the wheel with the tire deflated;

Fig. 3 is a side elevation looking from the outer side of the wheel, the annular extension of the hub being broken away to show some of the nuts and bolts for securing the removable tire retaining flange to the rim;

Fig. 4 is a fragmentary vertical section; and

Fig. 5 is a detailed transverse sectional view on the line 5—5 of Fig. 4.

While a preferred embodiment of the invention is shown in the drawings, it will be understood that minor changes and modifications may be made in the particular construction shown and the invention may be embodied in other forms as will appeal to those skilled in the art and falling within the scope of the appended claim without departing from the spirit of the invention.

Referring to a detailed description of the particular embodiment of the invention illustrated in the drawings, the wheel shown has a body part 1 consisting of a concave sheet metal disk terminating at its periphery in a laterally extending flange 2, and having a flat central part 3 adapted to be detachably secured by bolts 4 and nuts 5 on a conventional hub 6.

In accordance with the present invention, a rim is provided comprising a central channeled part 11 and annular side portions 12. The central channeled part has both of its side walls 13 and 14 formed integral with its bottom wall 15, and the annular side portions 12 of the rim are both formed continuously with the side walls 13 and 14, the latter extending parallel with the plane of the wheel. The rim is attached to the lateral flange 2 of the body 1 in any suitable way as by rivets 16 as shown.

The rim has tire-retaining flanges 17 and 18. The removable tire-retaining flange 17 is provided with an attaching part of ring formation of inverted L-shape in cross section, the same comprising an annular portion 19 extending laterally inwardly from the inner marginal portion of said flange, and a radially extending portion 20 extending inwardly from the inner marginal portion of the laterally extending portion 19. The laterally extending annular portion 19 of the attaching part is of a width corresponding substantially to the width of an annular side portion 12 of the rim and of a diameter to fit within the same, and the radially extending portion 20 of the attaching ring part is of a width corresponding substantially to the width of the adjoining annular side wall 13 of the rim and adapted to fit thereagainst.

The radially extending portion 20 is secured to the adjoining side wall 13 of the rim by bolts 21 and nuts 22. The bolts 21, as shown, have oval-shaped heads with smooth outer faces. Directly adjoining the heads, the bolts have flattened portions 21a to fit correspondingly shaped apertures in the side wall 13. The bolts are preferably welded to the side wall of the rim. Instead of securing the bolts 21 to the wall 13, the nuts may be fixedly secured thereto, in which case the nuts will be formed with smooth, rounded faces at the inner side thereof.

As will be appreciated, the side wall 13 and adjoining side portion 12 of the rim against which the radially extending portion 20 and the laterally extending portion 19 of the attaching ring fits form extended continuous bearing surfaces for the attaching part of the removable flange 17, and, with said side wall 13 and the adjoining side portion 12 of the rim formed continuously with the bottom wall 15 thereof, an especially strong rigid satisfactory construction is provided. The structure can be economically manufactured and the particular ring formation of the attaching part of the flange facilitates the quick positioning of the removable tire-retaining flange on the rim. 23 designates a tire on the rim.

A hub cap is provided comprising a main body part 24 and an annular portion 25 extending outwardly from the periphery of the main part 24. The annular extension 25 is of a diameter to extend over and conceal from view the securing bolts 21 and nuts 22 when the hub cap is applied to the wheel, the peripheral portion of said annular extension being disposed within the lateral annular portion 19 of the attaching part of the tire retaining flange 17 as shown. The hub cap has spring fingers 26 at its inner side to cooperate with an outer inturned marginal portion 27 of an annular flange 28 on the wheel body 1 to detachably connect the hub cap thereto.

The rim is provided at one side with an emergency safety auxiliary rim part formed by extending the tire-retaining flange 18 that is integrally formed with the adjoining side portion 12 of the rim and is inwardly curved, this emergency rim part comprising a laterally extending outwardly curved portion 29 immediately adjoining the flange 18, and a radially extending portion 30 extending from said laterally extending portion and provided at its periphery with a tread 31 adapted to engage the ground and reduce the drop upon deflation of the tire. The outwardly curved portion 29 of the emergency rim part, as shown, is of substantially the same width as the width of the inwardly curved flange 18, and the curvature of the same is substantially equal to the curvature of said flange. The particular shape of the auxiliary rim part and the formation of the same as a continuation of the flange 18 that is integral with the other rim structure, as will be appreciated, provides a particularly strong, rigid, serviceable construction.

The tread 31 of the safety rim part may be of any suitable form and may, if desired, include a rubber tire (not shown). In the particular exemplification of the invention illustrated in the drawings, the safety rim part is located at the inner side of the rim but it may be provided on either the inner side or the outer side of the rim.

What I claim is:

A vehicle wheel including a rim comprising an integrally formed channeled central part having side walls extending substantially parallel with the plane of the wheel, and annular side portions extending outwardly from the periphery of and formed continuously with said side walls, tire-retaining flanges at opposite sides of the rim, one of said flanges being removable, said removable flange having an attaching part of ring formation and L-shape in cross section, one of the flanges of said attaching part fitting against and being detachably secured to one of the annular side walls of the rim, the tire-retaining flange at the other side of the rim being integral with the adjoining annular side portion of the rim, said last mentioned flange being axially inwardly curved concavely with respect to the inner side of the wheel and being extended to provide an emergency safety rim part, the safety rim part comprising a curved portion of substantially the same axial width as the axial width of said last mentioned tire-retaining flange and the curvature of said curved portion being reverse to and substantially equal to the curvature of said last mentioned tire-retaining flange, said curved portion merging with said last mentioned tire-retaining flange along an area extending in a direction axially inwardly and radially outwardly, and an annular portion extending radially outwardly from the periphery of said curved portion and having a tread surface at its periphery to engage the ground upon deflation of the tire.

JOHN D. BROSICK.

REFERENCES CITED

The following references are of record in the file of this patent:

UNITED STATES PATENTS

| Number | Name | Date |
|---|---|---|
| 1,936,877 | La Brie | Nov. 28, 1933 |
| 2,086,358 | Godfrey | July 6, 1937 |
| 2,132,298 | Hunt | Oct. 4, 1938 |
| 2,145,525 | Pedro | Jan. 31, 1939 |
| 2,209,803 | Webb | July 30, 1940 |

FOREIGN PATENTS

| Number | Country | Date |
|---|---|---|
| 645,600 | France | Oct. 27, 1928 |
| 680,702 | France | May 5, 1930 |